3,192,249
METHYL 3β,5β-DIHYDROXY-B-NORPREGNAN-20-ONE-6β-CARBOXYLATE

Harold Russ Nace, Barrington, R.I., assignor to Richardson-Merrell Inc., New York, N.Y., a corporation of Delaware
No Drawing. Filed Dec. 28, 1961, Ser. No. 162,939
1 Claim. (Cl. 260—468)

This invention relates to a new B-norsteroid. Specifically, it relates to methyl 3β,5β-dihydroxy-B-norpregnan-20-one-6β-carboxylate.

The compound of this invention may be prepared by mild alkaline hydroylsis in methanol of 3β-acetoxy-5β-hydroxy-B-norpregnan-20-one-6β-carboxylic acid 5,6-lactone. This reaction not only serves to hydroylze the 5,6-lactone but also results in the simultaneous hydrolysis of the 3β-acetoxy group. The preparation of this compound may be illustrated as follows:

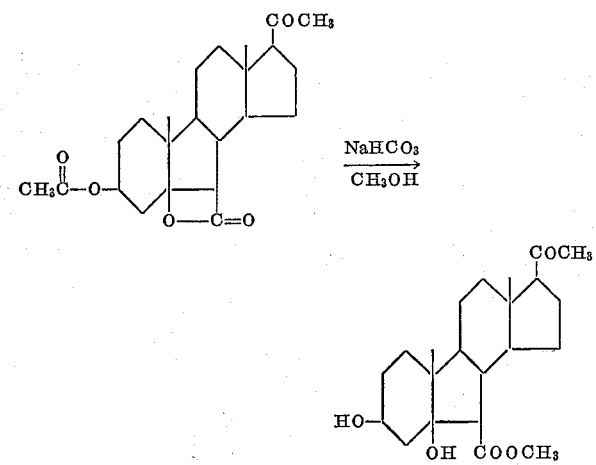

This compound has anti-estrogenic activity as evidenced by its ability to antagonize estrogen (estradiol) in the uterine endometrium test (McPhail), which is done in the rabbit. It has potentially useful therapeutic applications in the prevention and treatment of certain gynecological abnormalities, such as menstrual cycle irregularities and fertility-sterility problems. The compound is active orally, parenterally, and topically. The estimated human dose is between .001 mg. and 2 gm. dependent on route of administration and vehicle.

*Example 1.—Methyl 3β,5β-dihydroxy-B-norpregnan-20-one-6β-carboxylate*

To a solution of 0.25 g. (0.64 millimole) of 3β-acetoxy-5β-hydroxy-B-norpregnan-20-one-6β-carboxylic acid, 5,6-lactone in 50 ml. of methanol was added 1.0 g. of sodium bicarbonate and the resulting mixture was stirred at room temperature for 30 hours, during which time most of the sodium bicarbonate dissolved. The reaction mixture was then diluted with 300 ml. of water and extracted with two 150 ml. portions of ether. The ether solution was dried over anhydrous sodium sulfate, the ether evaporated, and the residue was crystallized from a mixture of petroleum ether (B.P. 30–60°) and ether to give 190 mg. (78 percent) of methyl 3β,5β-dihydroxy-B-norpregnan-20-one-6β-carboxylate, melting at 93–96° C. Two more recrystallizations from the same solvent gave an analytical sample, M.P. 97–98° C., $[\alpha]_D + 72.1°(CHCl_3)$.

*Analysis.*—Calcd. for $C_{22}H_{34}O_5$: C, 69.84; H, 8.99. Found: C, 69.63; H, 8.99.

The method of preparing the starting material 3β-acetoxy-5β-hydroxy-B-norpregnan-20-one-6β-carboxylic acid 5,6-lactone, is disclosed in patent application Serial No. 162,940 filed December 28, 1961, now abandoned. Briefly, the starting material, 3β-acetoxy-5β-hydroxy-B-norpregnan-20-one-6β-carboxylic acid 5,6-lactone, is prepared by oxidation of pregnenolone acetate with chromium trioxide according to the procedure of W. Klyne [W. Klyne, J. Chem. Soc., 3449 (1951)], to 3β-acetoxy-5,6-secopregnan-5,20-dione-6-oic acid followed by cyclization to the desired 3β-acetoxy-5β-hydroxy-B-norpregnan-20-one-6β-carboxylic acid 5,6-lactone.

I claim:
Methyl 3β,5β-dihydroxy-B-norpregnan-20-one-6β-carboxylate.

References Cited by the Examiner

Boswell et al., "Bull. Soc. Chem. (France)" 1958, pp. 1598–1599.

Groggins, "Unit Processes in Org. Syn.," vol. IV, 1952, pp. 616–620.

LORRAINE A. WEINBERGER, *Acting Primary Examiner.*

DUVAL T. McCUTCHEN, LEON ZITVER, *Examiners.*